W. A. MOIR.
DIFFERENTIAL GEARING FOR AUTOMOBILE DRIVING AXLES.
APPLICATION FILED JAN. 19, 1921.
1,407,703.
Patented Feb. 28, 1922.
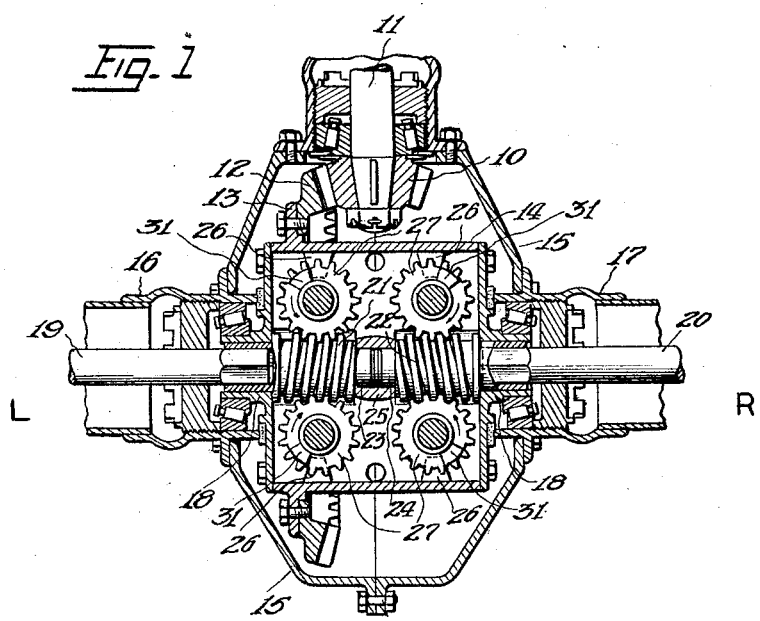
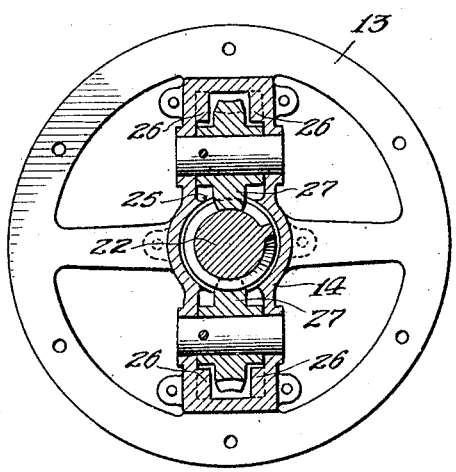
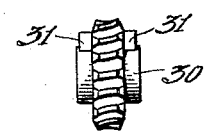
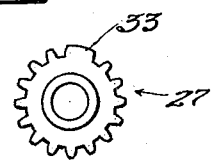
INVENTOR:
William Alexander Moir
By Otto Munk
his ATTORNEY.

UNITED STATES PATENT OFFICE.

WILLIAM ALEXANDER MOIR, OF BURWOOD, NEAR SYDNEY, NEW SOUTH WALES, AUSTRALIA.

DIFFERENTIAL GEARING FOR AUTOMOBILE DRIVING AXLES.

1,407,703. Specification of Letters Patent. Patented Feb. 28, 1922.

Application filed January 19, 1921. Serial No. 438,313.

*To all whom it may concern:*

Be it known that I, WILLIAM ALEXANDER MOIR, of Lavinia, Liverpool Road, Burwood, near Sydney, New South Wales, Australia, a subject of the King of Great Britain and Ireland, have invented new and useful Improvements in Differential Gearing for Automobile Driving Axles, of which the following is a specification.

This invention consists in differential gearing of the automatic locking type, that is to say, differential gearing through which rotative movement is applied to and equalized between the two portions of a divided axle, so that the wheels whilst being driven thereby may turn differentially, but so that the gearing will lock automatically and drive both wheels positively whilst the vehicle is running on a straight course, when one of the wheels slips and loses traction, or when one of the axles fails. The differential gear in which the invention consists comprises worm wheels rotatably mounted in a corner on a driving bevel crown wheel, with their worm wheel teeth in mesh with worms on the inner ends of the axles or on sleeves into which the inner ends of the axles are fitted. Said worm wheels are capable of one rotation only. In practice it is preferred, for reasons which will be hereinafter explained, to associate two or more worm wheels with each axle worm, but the invention may be embodied in a structure in which only one worm wheel is provided for each axle worm.

When by means of the usual drive bevel and crown wheel the differential carrier is rotated, the worm wheels therein are revolved around the axle worms and in so revolving are caused to rotate on their spindles. Whilst they are in rotation driving torque is not applied to the axles, but if the rotative movement of the worm wheels is checked, they function as keys which lock the respective axle sections to the carrier, and the rotation of the carrier is then applied through the key thus established directly to the axles. If the worm wheel (or wheels) associated with one of the axle worms is stopped in its rotation before the worm wheel (or wheels) associated with the worm on the other axle is stopped in its rotation, torque will be applied for the time being only to that axle section which has been "keyed" to the carrier. Though the vehicle may be running on a straight course it will be found under such running conditions the locked axle will rotate somewhat faster than the free axle, with the result that sooner or later the worm wheel (or wheels) associated with the free axle will have been rotated sufficiently to engage a stop associated with it, and thereafter both axles will be driven together, as if a solid axle. When the course of the vehicle is diverted from the straight, as in turning a corner, the outer wheel, as is well understood, traverses a larger circle than the inner wheel and makes a greater number of turns. According to the track width of the wheels and the diameter of the wheels, the difference in the number of rotations performed by the two wheels respectively will vary, but is usually about three revolutions difference when the vehicle turns a complete circle. The wheel on the outside of the track in rotating faster than the inner wheel turns the worm wheel in the carrier reversely, backing said wheel off its stop so that when the vehicle is brought again on the straight course the torque continues to be applied through the still locked worm wheel to the axle of that wheel which was on the inner side of the curve thus negotiated, until the other wheel relatively loses a number of rotations corresponding with the number of rotations by which it overran the inner wheel whilst the vehicle was negotiating the curve. It has been found in practice that when a vehicle fitted with this gearing has turned around a corner (that is through a quarter circle) the two wheels usually come into step, that is to say, come into the gear locked position again in a distance of fifty yards, more or less, the outer wheel in such cases having to lose only about one half a rotation.

The axle worms on the shaft ends are disposed oppositely, so that the end thrust reaction of the drive through the axle worms and their worm wheels from the differential carrier will be balanced. The axle ends may be arranged with an antifriction end thrust washer between them to minimize risk of jamming the axles together; it is necessary that either axle shall always be quite free to turn relatively to the other axle. The mechanical detail associated with the thrust bearings and other structural parts of the axle assembly are no part of the present invention and a variety of designs may be devised, all more or less equally appropriate to the circumstances.

The stop means provided for preventing rotation of the worm wheels which are meshed with the axle worms may suffer variation at the hands of a designer, thus for instance, lugs may be provided on the sides of the worm wheels and fixed stops set in the carrier adapted to be engaged by said lugs, so that when said wheels turn so as to bring their lugs against said stops, further rotation will be prevented: or the wheels may be made without such lugs and the stops may be omitted if in the cutting of the wheels teeth one tooth space is left uncut, so that when the worm wheel comes to the place at which the filled tooth space is engaged by the worm thread the wheel is chocked against the worm thread and further rotation checked; or again the worm wheels may be mounted on spindles extended through their bearings in the carrier and said spindles fitted with arms adapted to contact with stops on the outer part of the carrier. In any case, adjusting devices may be provided, where two or more worm wheels are associated with each axle worm, to ensure that the several wheels in the same group will come to the stop position simultaneously thereby to effect distribution of the load equally between them.

In the accompanying drawing, Fig. 1 is an horizontal section through portions of a differential axle casing in which the invention is embodied;

Fig. 2 is a transverse section through the carrier attached to the crown wheel mounting ring;

Fig. 3 is an elevational view of one of the worm wheels showing stop lugs on either cheek of same;

Fig. 4 is a side view of a worm wheel in which one tooth space is uncut, thus leaving a solid sector which operates as a stop to lock the wheel with the axle worm engaging it.

10 is a bevel pinion mounted in suitable neck bearings on the end of a stub shaft 11, which is coupled to the propeller shaft. The pinion 10 gears with the bevel crown 12, and the bevel crown 12 is mounted on the circular ring 13 which forms part of the structure of the differential carrier 14. The carrier 14 is a box-like housing accommodating within it the axle worms and having in it spindle bearings for the worm wheels which mesh with said worms. The carrier 14 and the ring 13 are rotatably enclosed in the casing 15, and to the cheeks of the casing 15 the ends of the axle casings 16—17 are fitted. The carrier 14 is formed with hub portions 18 which are rotatably supported in bearings in the axle casings through which bearings the axles 19, 20 are slid and engaged by their castellated or keyed ends in the sockets in the worm heads 21—22, which have their bearings in the carrier; said bearings are in axial alignment with each other. One of the worms is right hand and the other left hand, the direction of the pitch being arranged so that under normal driving conditions the reaction thrust tends to bring the inner journal ends 23—24 of the worm heads into contact, an end thrust washer being fitted between the parts 23—24 if deemed desirable.

In the carrier 14 four worm wheels 27 are rotatably mounted. Two of these wheels mesh respectively with the worm heads 21—22. In order to distribute the stresses it is desirable to have at least two worm wheels oppositely disposed in relation to each worm head as shown, but the device will function with only one worm wheel meshed with each worm head; if, however, it is thought desirable, there may be three or four worm wheels meshed with each worm head, the structural arrangement of the carrier being modified accordingly to accommodate the worm wheels. 25 is a central bearing in the carrier 14 supporting the journals 23—24 on the inner ends of the worm heads 21—22. 26 are stops formed integral or permanently fixed in the carrier 14 on either side of the worm wheels, the lugs 31 are adapted to contact with the stops 26 and thereby prevent further rotation of the respective worm wheels in one direction.

Instead of providing lugs 31 coacting with stops 26 for limiting the rotational movement of the worm wheels, said movement may be checked by forming the worm wheels as shown in Fig. 4 with a solid sector portion 33. When a worm wheel so constructed is rotated by the rotational movement of the worm meshed with it, the solid portion 33 on the worm face locks the parts, as when it touches the worm their further rotation is prevented. It is practically immaterial what device is provided for limiting the rotation of the worm wheels and procuring the locking effect so long as some means be provided whereby rotation of those wheels through a certain arc is permitted. The arc of movement preferably approximates to a complete circle, that is one complete rotation.

The operation is as follows:—Starting from the position shown in Fig. 1 with the stub shaft 11 moving anti-clockwise, the bevel crown 12 moves clockwise, causing clockwise rotation of the carrier 14 and consequently clockwise revolution of the worm wheels 27 around the worms 21 and 22. In this movement the worm wheels are rotated in the direction indicated by the arrows thereon respectively, and torque is for the time being not applied to the axles 19 and 20. As soon, however, as the lugs 31 contact with the stops 26 further rotational movement of the worm wheels is prevented and the carrier is then in effect locked to the two worms 21—22, and torque movement is applied to the axles, and the car is driven. If now, with all the lugs 31 in contact with their respective stope 26, the car is driven in a curve, as in rounding a corner, the axle of the wheel which is running on the outer side of the curve will make a greater number of rotations than the other axle. The result will be that the overrunning worm (21 or 22 as the case may be) will turn the worm wheels meshed with it reversely so as to move the lugs 31 thereon back from their stops 26; thereafter the drive continues to be applied only to the axle of the wheel on the inner side of the curve. But the overrunning axle will immediately lag in its rotations, and as it lags the worm wheels geared to its worm will be gradually turned positively again until in the course of a few score yards the lugs 31 will again be brought into contact with their stops 26, whereupon the normal driving condition will be reestablished and the vehicle will be driven by the engine as if the two axle sections were one solid axle.

The device of this invention therefore offers an effective mechanical means whereby quite effective differential action is obtained with the drive applied to one wheel only at all times other than when the vehicle is running a straight course, and the automatic locking action of the gearing will always become effective as soon as and will remain effective as long as any inequality of running condition as between the two wheels subsists, as for instance when the vehicle is being driven in a curved course.

What I claim as my invention and desire to secure by Letters Patent is:—

1. Differential axle gear, comprising a worm head on either axle end, worm wheels meshed respectively with said worms, said worm wheels rotatably mounted in a carrier rotatable about the axle axis and having the driving crown wheel fixed to it, and means for limiting the degree of rotation of said worm wheels, and thereby locking said wheels with the axle worms with which they are respectively engaged.

2. Differential axle gear wherein the drive is applied to the axles through worm heads thereon through worm wheels meshed respectively with said worms and rotatable through a predetermined arc in bearings in a carrier on which the driving crown is fixed.

3. Differential axle gear characterised in that both axles are normally locked to a common driving element through worm and worm wheel gears with liberty to either axle to overrun the other axle and thus to rotate said gearing negatively on the overrunning axle and temporarily unlock the said axle from said common driving element.

In testimony whereof I have signed my name to this specification.

WILLIAM ALEXANDER MOIR.